(12) United States Patent
Nigro et al.

(10) Patent No.: US 8,980,029 B1
(45) Date of Patent: Mar. 17, 2015

(54) DOUBLER REPAIR APPARATUS AND METHOD

(75) Inventors: Mary Katherine Nigro, Marysville, WA (US); Marc R. Matsen, Seattle, WA (US); Robert James Miller, Fall City, WA (US)

(73) Assignee: The Boeing Company, Chicago, IL (US)

( * ) Notice: Subject to any disclaimer, the term of this patent is extended or adjusted under 35 U.S.C. 154(b) by 68 days.

(21) Appl. No.: 13/109,051

(22) Filed: May 17, 2011

(51) Int. Cl.
*B29C 73/00* (2006.01)
*B32B 43/00* (2006.01)
*B29C 65/00* (2006.01)
*B31B 1/60* (2006.01)
*B32B 37/00* (2006.01)
*B29C 47/00* (2006.01)
*B32B 38/04* (2006.01)
*B29C 65/36* (2006.01)

(52) U.S. Cl.
CPC .................. *B29C 65/36* (2013.01)
USPC .................. 156/94; 156/60; 156/97; 156/98; 156/244.17; 156/272.2; 156/272.4; 156/273.7

(58) Field of Classification Search
CPC ........ B29C 65/00; B29C 65/02; B29C 65/32; B29C 65/22; B29C 65/221; B29C 65/222; B29C 65/245; B29C 65/36; B29C 65/3664; B29C 65/362; B29C 65/3624; B29C 65/3672; B29C 65/3676; B29C 65/368; B29C 65/3684; B29C 65/3696; B29C 65/483; B29C 65/4835; B29C 65/50; B32B 3/00; B32B 7/00; B32B 7/12; B32B 15/043; B32B 15/08; B32B 27/00; B32B 27/04; B32B 27/06; B32B 27/08; B32B 37/00; B32B 37/04; B32B 37/12; B32B 37/1207; B32B 37/14; B32B 37/16
USPC ................. 156/94, 60, 97, 98, 244.17, 272.2, 156/272.4, 273.7
See application file for complete search history.

(56) References Cited

U.S. PATENT DOCUMENTS

| | | | | |
|---|---|---|---|---|
| 4,521,659 A | * | 6/1985 | Buckley et al. | 219/633 |
| 5,240,542 A | * | 8/1993 | Miller et al. | 156/272.4 |
| 5,313,037 A | * | 5/1994 | Hansen et al. | 219/632 |
| 6,566,635 B1 | * | 5/2003 | Matsen et al. | 219/633 |
| 6,884,976 B2 | | 4/2005 | Matsen et al. | |
| 2004/0099660 A1 | * | 5/2004 | Matsen et al. | 219/634 |

FOREIGN PATENT DOCUMENTS

WO     WO 9821023 A1 *  5/1998 ............. B29C 65/02

* cited by examiner

*Primary Examiner* — Richard Crispino
*Assistant Examiner* — Matthew Hoover
(74) *Attorney, Agent, or Firm* — Parsons Behle & Latimer

(57) ABSTRACT

A doubler repair apparatus includes a composite structure having a repair area, a susceptor having an adhesive film and at least one magnetic component extending within the adhesive film on the repair area, a repair doubler patch on the susceptor and a heat source having an induction coil generally above the repair doubler patch.

20 Claims, 3 Drawing Sheets

DOUBLER REPAIR APPARATUS AND METHOD

CROSS-RELATED APPLICATIONS

This application is related to co-pending U.S. patent application Ser. No. 13/109,061, filed concurrently herewith on May 17, 2011, which is incorporated by reference herein in its entirety.

TECHNICAL FIELD

The disclosure generally relates to repair of composite materials. More particularly, the disclosure relates to a doubler repair apparatus and method in which an aligned induction coil electromagnetic is coupled to a low Curie temperature susceptor material to produce localized adhesive resin heating and subsequent cure.

BACKGROUND

Repair doubler patches may be used to repair composite materials in a variety of applications. In the aircraft industry, for example, repair doubler patches may be used to repair an area of a composite material fuselage, wing skin panel or other composite structure. The repair doubler patch may be applied to the repair area on the composite structure with an adhesive using heat and pressure to cure the adhesive and form a strong bond between the patch and the structure.

Current pre-cured composite repair doubler patches which bond to composite structures may utilize either chemical heat packs or electrical heat blankets. Chemical heat packs may require little or no technical training for operation and no electrical power source. However, chemical heat packs may have a limited upper temperature (such as 120 degrees F.) and duration at desired temperature (such as less than 30 minutes). Heat blankets may be more reliable than chemical heat packs in holding temperature and reaching higher temperatures but require a control system which is operated by a skilled technician as well as an electrical source for operation. Both chemical heat packs and heat blankets may generate thermal heat from the exterior portion of the repair with no guarantee that the heat is being distributed evenly and thoroughly. Thermal couples may be used to monitor temperature but are only capable of recording temperature at a single point. Chemical heat packs and heat blankets may not provide any compaction capability. Consequently, heating may not be localized to the adhesive bondline of the repair doubler patch.

For composite bonded repairs, even heat distribution across the adhesive bondline area of the repair may be desirable. Even and accurate adhesive heating for the curing process may be necessary to meet desired structural properties of the adhesive material used to effect the repair.

Accordingly, a doubler repair apparatus and method are needed for the repair curing process to meet desired structural properties of the adhesive material in a repair.

SUMMARY

The disclosure is generally directed to a doubler repair apparatus. An illustrative embodiment of the apparatus includes a composite structure having a repair area, a susceptor having an adhesive film and at least one magnetic component extending within the adhesive film on the repair area, a repair doubler patch on the susceptor and a heat source having an induction coil generally above the repair doubler patch.

In some embodiments, the doubler repair apparatus may include a composite structure having a repair area; a susceptor having an adhesive film and at least one magnetic component extending within the adhesive film on the repair area; a repair doubler patch on the susceptor; and a heat source having an induction coil generally above the repair doubler patch. The induction coil of the heat source is adapted to induce a magnetic flux field in the susceptor. The magnetic flux field is generally parallel to the repair area.

The disclosure is further generally directed to a doubler repair method. An illustrative embodiment of the method includes providing a composite structure having a repair area, placing a susceptor having an adhesive film and at least one magnetic component extending within the adhesive film on the repair area, placing a repair doubler patch on the susceptor and inducing a magnetic flux field oriented parallel to the repair surface in the susceptor.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
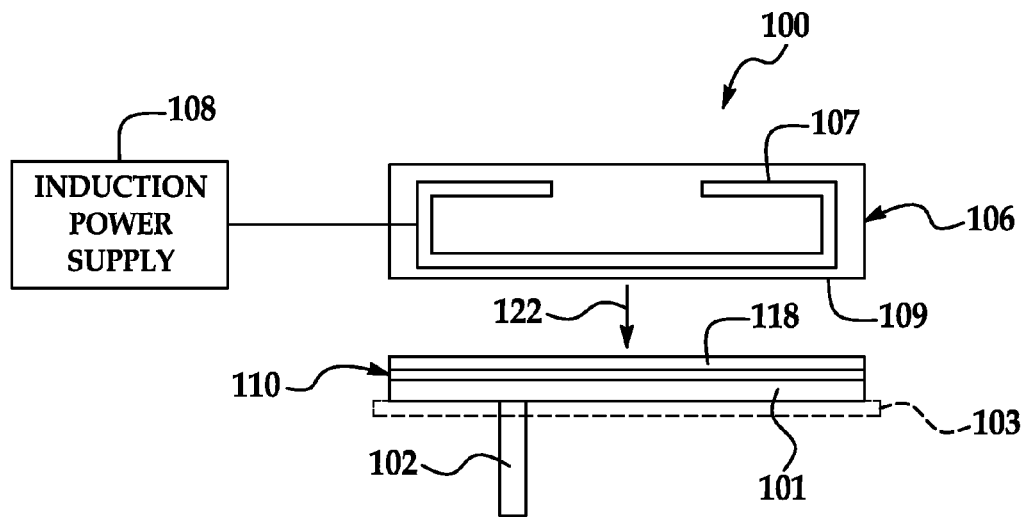
FIG. 1 is a block diagram of an illustrative embodiment of the doubler repair apparatus.
Figure 2:
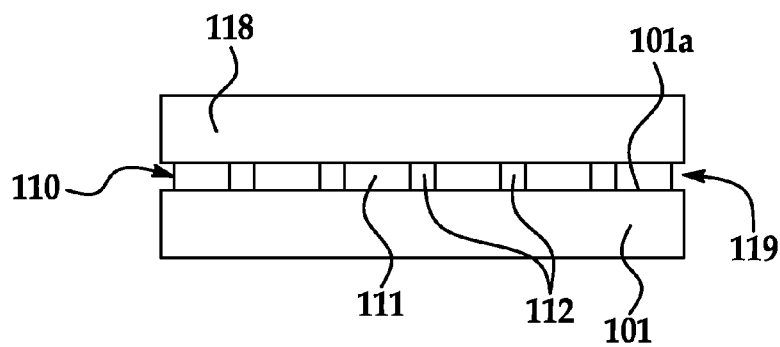
FIG. 2 is an enlarged sectional view of a support with a susceptor on the support and a composite structure with a repair doubler patch on the composite structure in exemplary application of the doubler repair apparatus.
Figure 3:
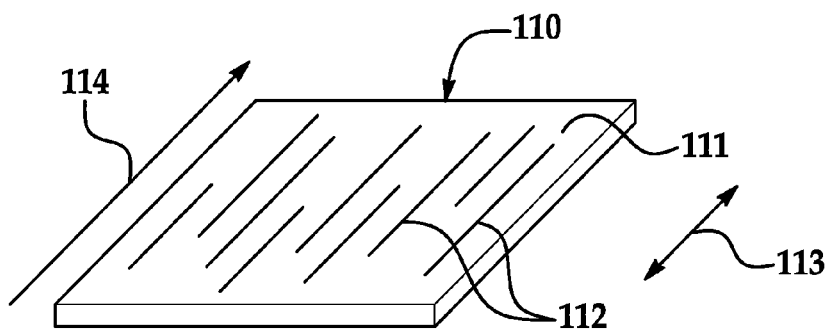
FIG. 3 is a perspective view of the susceptor of the doubler repair structure, with a magnetic field oriented in parallel relationship to susceptor wires in the susceptor in exemplary application of the doubler repair apparatus.

Referring to FIGS. 1-3, an illustrative embodiment of the doubler repair apparatus, hereinafter apparatus, is generally indicated by reference numeral 100. The apparatus 100 may include a support 103. The support 103 may be sized and configured to support a composite structure 101 for repair of the composite structure 101. A heat sink 102 may interface with the support 103 and may be disposed in thermal contact with the composite structure 101 when the composite structure 101 is placed on the support 103.

A susceptor 110 may be provided on the composite structure 101. As shown in FIG. 2, the susceptor 110 may include an adhesive film 111 on the support 101. In some embodiments, multiple magnetic susceptor wires 112 may be provided in the adhesive film 111. As shown in FIG. 3, the susceptor wires 112 may extend within the plane of the adhesive film 111 in generally parallel, spaced-apart relationship with respect to each other. The susceptor wires 112 may also be oriented generally parallel to a plane of the repair area 101a on the composite structure 101. Each magnetic susceptor wire 112 may have a low Curie temperature point. Each susceptor wire 112 may have a square cross-section, a circular cross-section or alternative cross-sectional shape. In other embodiments, at least one other magnetic component such as magnetic foil, for example and without limitation, may extend throughout the adhesive film 111.

In operation of the apparatus 100, which will be hereinafter described, a heat source 106 generates a magnetic flux field 114 (FIG. 3). The magnetic flux field 114 may be parallel to the plane of the susceptor 110. The magnetic flux field 114 may also be parallel to the longitudinal axis 113 of each susceptor wire 112 in the susceptor 110.

As shown in FIG. 1, the heat source 106 of the apparatus 100 may include an induction coil 107 and a compaction surface 109. As shown in FIG. 1, the heat source 106 may be adapted to apply compaction pressure 122 against a repair doubler patch 118 as will be hereinafter further described. In some embodiments, the induction coil 107 of the heat source 106 may have a Litz wire configuration in which a number of individually insulated magnetic wires (not shown) may be twisted or braided into a uniform pattern. An induction power supply 108 may be electrically connected to the induction coil 107.

In exemplary application of the apparatus 100, a composite structure 101 which is to be repaired is placed on the support 103. The susceptor 110 is placed on the repair area 101a of the composite structure 101. A repair doubler patch 118 is placed over the susceptor 110. Accordingly, the adhesive film 111 of the susceptor 110 defines what will become the adhesive bond line 119 (FIG. 2) between the repair doubler patch 118 and the underlying composite structure 101.

The heat source 106 is operated using the induction power supply 108. The induction coil 107 of the heat source 106 induces a magnetic flux field 114 (FIG. 3) in and around the susceptor 110. The magnetic flux field 114 is parallel to the plane of the susceptor 110 and to the plane of the repair area 101a on the composite structure 117. This orientation of the magnetic flux field 114 minimizes unwanted inductive heating of composite carbon fibers (not shown) in the composite structure 101. The magnetic flux field 114 is also parallel to the longitudinal axis 113 (FIG. 3) of each susceptor wire 112 in the susceptor 110. Simultaneously, the heat source 106 may be operated to apply the compaction surface 109 against the repair doubler patch 118 at a selected magnitude of compaction pressure 122.

Due to the ferromagnetic properties of the susceptor wires 112 in the susceptor 110, the magnetic flux field 114 produced by the induction coil 107 generates a current flow which runs around the perimeter of the cross-section of each susceptor wire 112. The current flow which is induced by the magnetic flux field 114 creates a thermal reaction in the susceptor 110. Because the composite structure 101 does not have the same ferromagnetic properties as the susceptor 110 and the magnetic flux field 114 is oriented parallel to the surface of the composite structure 101, very limited heating of the composite structure 101 occurs. Therefore, the apparatus 100 achieves the required cure temperature for the repair doubler patch 118 while heating only the adhesive bond line 119 at the susceptor 110 through inductive heating. Consequently, heating is substantially limited to and evenly distributed over the adhesive bond line 119 and general heating of the entire repair area 101a on the composite structure 101 is avoided. Additionally, the heat sink 102 may remove any heat which might otherwise be absorbed by the composite structure 101. After the adhesive bond line 119 is formed by heating and compression of the repair doubler patch 118, the repaired composite structure 101 is removed from the support 103.

Figure 4:
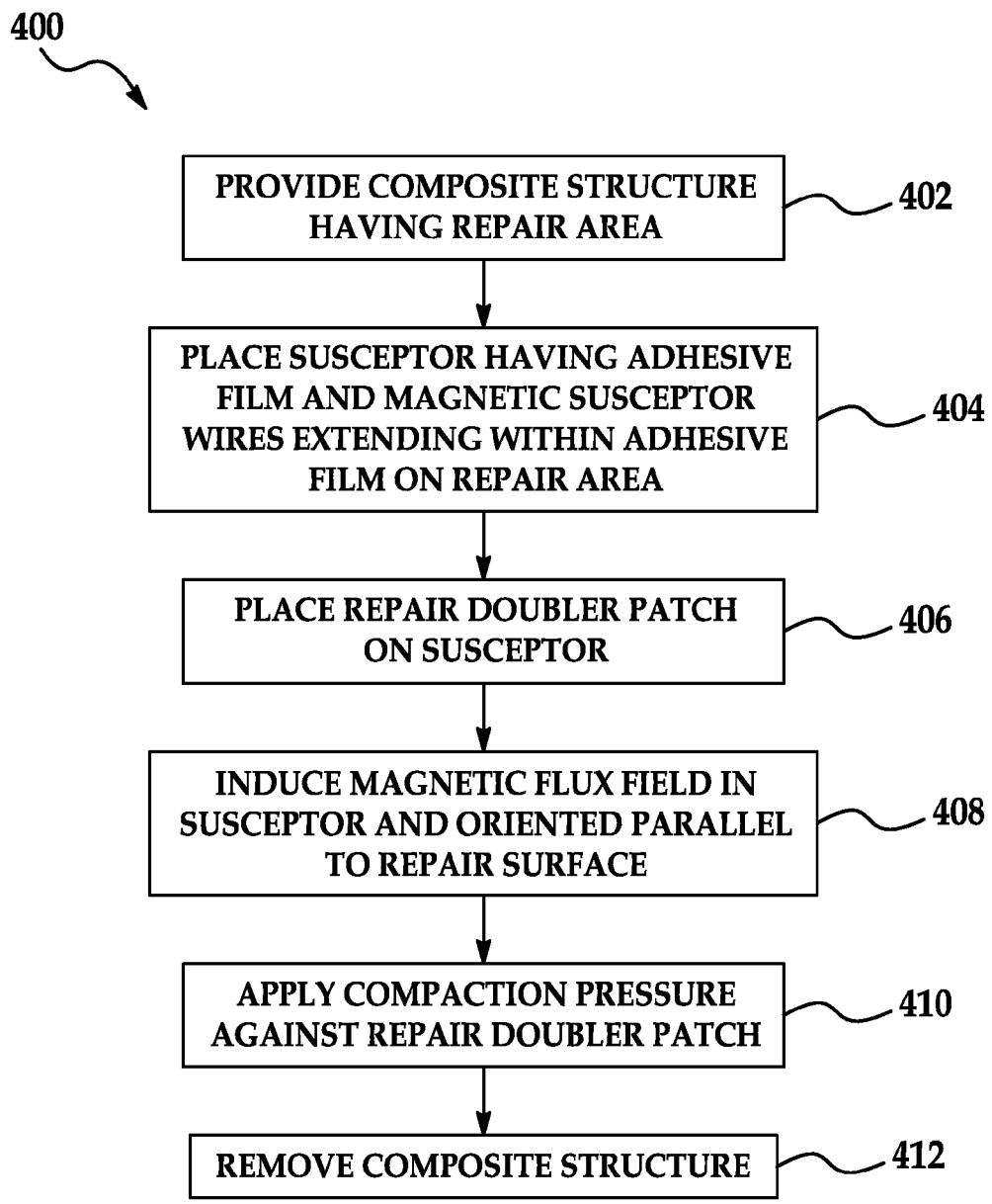
FIG. 4 is a flow diagram of an illustrative embodiment of a doubler repair method.

Referring next to FIG. 4, a flow diagram 400 of an illustrative embodiment of a doubler repair method is shown. In block 402, a composite structure having a repair area may be provided. In block 404, a susceptor having an adhesive film and magnetic susceptor wires or other magnetic component or components extending within the adhesive film may be placed on the repair area of the composite structure. The susceptor wires may extend within the plane of the adhesive film in generally parallel, spaced-apart relationship with respect to each other. In block 406, a repair doubler patch may be placed on the susceptor. In block 408, a magnetic flux field may be induced in the susceptor. The magnetic flux field may be oriented parallel to the repair area on the composite structure. The magnetic flux field may also be oriented parallel to the susceptor wires in the susceptor. In some embodiments, a heat sink may remove excess heat from the composite structure. In block 410, compaction pressure may be applied against the repair doubler patch. In block 412, the repaired composite structure may be removed from a support.

Figure 5:
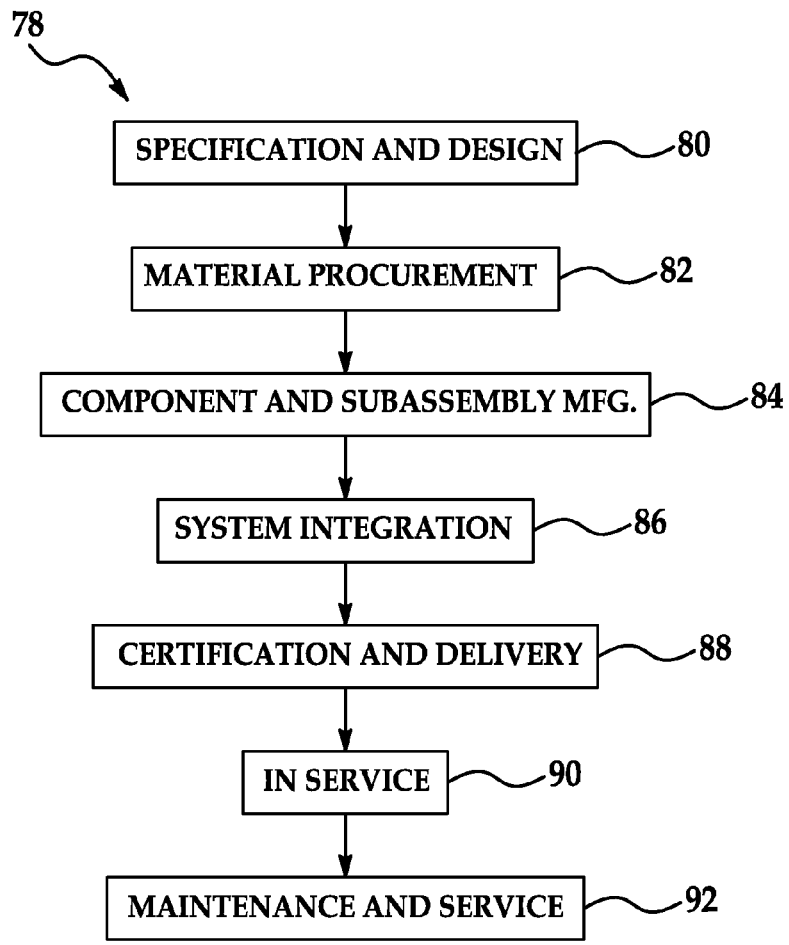
FIG. 5 is a flow diagram of an aircraft production and service methodology.
Figure 6:
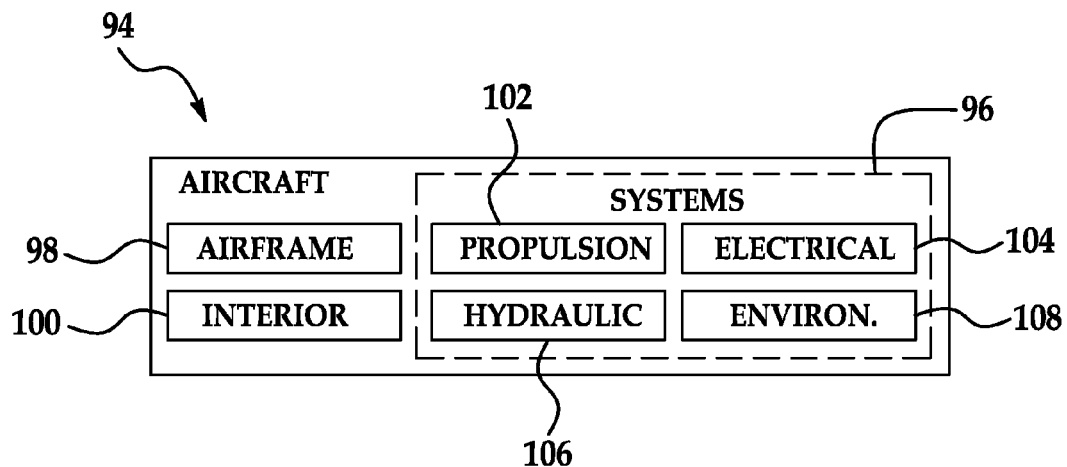
FIG. 6 is a block diagram of an aircraft.

Referring next to FIGS. 5 and 6, embodiments of the disclosure may be used in the context of an aircraft manufacturing and service method 78 as shown in FIG. 5 and an aircraft 94 as shown in FIG. 6. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A doubler repair apparatus, comprising:
a composite structure having a repair area;
a susceptor layer, disposed over said repair area, comprising an adhesive film and a plurality of magnetic susceptor wires within the adhesive film, each magnetic susceptor wire having a longitudinal axis and being generally parallel to all other magnetic susceptor wires;
a repair doubler patch disposed over said susceptor layer; and
a heat source having an induction coil generally above said repair doubler patch, the induction coil adapted to induce in the susceptor layer a magnetic flux field that is generally parallel to the longitudinal axes of all of the magnetic susceptor wires.

2. The apparatus of claim 1 wherein said magnetic susceptor wires are oriented in spaced-apart relationship to each other.

3. The apparatus of claim 2 wherein said magnetic susceptor wires are oriented generally parallel to a plane of said repair area.

4. The apparatus of claim 1 further comprising a heat sink disposed in thermal communication with said composite structure.

5. The apparatus of claim 1 wherein said induction coil comprises a Litz wire configuration.

6. The apparatus of claim 1 wherein said heat source is adapted to apply compaction pressure against said repair doubler patch.

7. The apparatus of claim 6 further comprising a compaction surface on said heat source.

8. A doubler repair apparatus, comprising:
a composite structure having a repair area;
a susceptor layer, disposed over said repair area, comprising an adhesive film and at least one magnetic component extending within said adhesive film on said repair area, the at least one magnetic component comprising a plurality of magnetic susceptor wires, each magnetic susceptor wire having a longitudinal axis and being generally parallel to all other magnetic susceptor wires;
a repair doubler patch disposed over said susceptor layer;
a heat source having an induction coil generally above said repair doubler patch; and
said induction coil of said heat source is adapted to induce a magnetic flux field in said susceptor layer, said magnetic flux field generally parallel to said repair area and generally parallel to the longitudinal axes of all of the magnetic susceptor wires.

9. The apparatus of claim 8 wherein said magnetic susceptor wires are oriented in spaced-apart relationship to each other.

10. The apparatus of claim 9 wherein said magnetic susceptor wires are oriented generally parallel to a plane of said repair area.

11. The apparatus of claim 8 further comprising a heat sink disposed in thermal communication with said composite structure.

12. The apparatus of claim 8 wherein said induction coil comprises a Litz wire configuration.

13. The apparatus of claim 8 wherein said heat source is adapted to apply compaction pressure against said repair doubler patch.

14. The apparatus of claim 13 further comprising a compaction surface on said heat source.

15. The apparatus of claim 1, wherein each magnetic susceptor wire has a square cross-section.

16. The apparatus of claim 8, wherein each magnetic susceptor wire has a square cross-section.

17. A doubler repair apparatus, comprising:
a susceptor layer, comprising an adhesive film and a plurality of magnetic susceptor wires within the adhesive film, each magnetic susceptor wire having a longitudinal axis and being generally parallel to all other magnetic susceptor wires, the susceptor layer adapted to be placed between a repair area of a composite structure and a repair doubler patch; and
a heat source, adapted to be placed generally above the repair doubler patch, having an induction coil adapted to induce in the susceptor layer a magnetic flux field that is generally parallel to the longitudinal axes of all of the magnetic susceptor wires.

18. The apparatus of claim 17, further comprising a compaction surface on the heat source, adapted to apply compaction pressure against the repair doubler patch.

19. The apparatus of claim 17, wherein the magnetic susceptor wires are oriented in spaced-apart relationship to each other, and are configured to be oriented generally parallel to a plane of the repair area when the susceptor layer is placed between the repair doubler patch and the composite structure.

20. The apparatus of claim 17, wherein the induction coil comprises a Litz wire configuration.

* * * * *